United States Patent [19]

Yamasaki et al.

[11] Patent Number: 5,599,443
[45] Date of Patent: Feb. 4, 1997

[54] APPARATUS FOR WASTE WATER TREATMENT USING CHARCOAL BIOLOGICALLY ACTIVATED

[75] Inventors: Kazuyuki Yamasaki, Hiroshima; Shirou Imazu, Fukuyama; Takashi Fujiwara, Ashina-gun, all of Japan

[73] Assignee: Sharp Kabushiki Kaisha, Osaka, Japan

[21] Appl. No.: 336,680

[22] Filed: Nov. 7, 1994

[30] Foreign Application Priority Data

Nov. 8, 1993 [JP] Japan ................................. 5-278181

[51] Int. Cl.$^6$ ........................................................ C02F 3/06
[52] U.S. Cl. .......................... 210/151; 210/284; 210/602; 210/616
[58] Field of Search .................................. 210/602, 150, 210/151, 170, 615–618, 283, 284

[56] References Cited

U.S. PATENT DOCUMENTS

| 681,884 | 9/1901 | Monjeau | 210/602 |
|---|---|---|---|
| 4,333,263 | 6/1982 | Adey | 210/602 |
| 4,839,051 | 6/1989 | Higa | 210/602 |
| 4,940,546 | 7/1990 | Vogelpohl et al. | 210/613 |
| 5,156,741 | 10/1992 | Morrison et al. | 210/602 |
| 5,322,621 | 6/1994 | Fan et al. | 210/151 |

FOREIGN PATENT DOCUMENTS

| 0306054 | 3/1989 | European Pat. Off. . |
|---|---|---|
| 2539407 | 7/1984 | France . |
| 3827716A1 | 3/1990 | Germany . |
| 64-43306 | 2/1989 | Japan . |
| 1-95000 | 4/1989 | Japan . |
| 2-229595 | of 1990 | Japan . |
| 4-260497 | of 1992 | Japan . |
| WO90/02710 | 3/1990 | WIPO . |
| WO95/13246 | 5/1995 | WIPO . |

OTHER PUBLICATIONS

Patent Abstracts of Japan, vol. 018 No. 456, 25 Aug. 1994, Abstract.
Database WPI, Section Ch, Week 7914, Derwent Publications Ltd., London, GB; Abstract.

*Primary Examiner*—Thomas G. Wyse
*Attorney, Agent, or Firm*—Nixon & Vanderhye

[57] ABSTRACT

The apparatus for waste water treatment has, in a tank, a contact circulation part in which Bincho charcoal is accommodated, a sprinkling circulation part which is disposed above the contact circulation part and in which black coal is accommodated, air lift piping for lifting treatment-object water from the contact circulation part to the sprinkling circulation part, a water-sprinkling tube for sprinkling the treatment-object water onto the sprinkling circulation part, an aquatic plant cultivation bed disposed between the contact circulation part and the sprinkling circulation part, and air-diffusing tubes for introducing malodorous gas. Small quantity of surfactants and colorants are adsorbed by the Bincho charcoal and the black coal and decomposed by microorganisms that have grown in the Bincho charcoal and the black coal. The microorganisms act to biologically decompose the malodorous gas.

13 Claims, 2 Drawing Sheets

APPARATUS FOR WASTE WATER TREATMENT USING CHARCOAL BIOLOGICALLY ACTIVATED

BACKGROUND OF THE INVENTION

1. Field of the Invention

The present invention relates to an apparatus and method for waste water treatment which can accomplish high level waste water treatment using charcoal biologically activated (i.e. charcoal in which microorganisms have been grown), for waste water and malodorous gas containing hard-to-decompose chemical substances such as surfactants, and which can treat malodorous gas at the same time.

2. Description of the Prior Art

Conventionally, in apparatuses for waste water treatment in various industrial facilities and laboratories, activated charcoal has been utilized at their terminals, i.e., at the stage of high level treatment.

Also, malodorous gas accompanying the waste water has been treated by a malodorous gas treating apparatus of the scrubber system, the activated charcoal adsorption system, or the like entirely independently of the above apparatus for waste water treatment.

As the way of utilizing activated charcoal in the high level treatment of waste water at the terminal of waste water treatment, available are physical methods in which only the adsorptive action of activated charcoal, i.e., physical treatment is expected, and physical-biological methods in which with microorganisms propagated in activated charcoal, two fields of treatment, i.e., physical adsorptive treatment inherent in the activated charcoal and biological treatment by the above microorganisms are utilized. More specifically, the latter physical-biological methods are such that activated charcoal adsorbs chemical substances and the adsorbed chemical substances are decomposed by the microorganisms that have propagated in the activated charcoal.

High concentration toxic waste water containing hard-to-decompose surfactants, which is discharged from various types of industrial facilities, semiconductor factories, liquid crystal factories, and the like, is recently increasingly subject to waste water treatment within their own sites. In such a background surrounding those factories, first described in detail is a concrete example of granular activated charcoal utilized, for example, in the high level waste water treatment systems.

High concentration toxic waste water, for example, developer-containing waste water discharged from the existing semiconductor and liquid crystal factories contains 2000 to 10000 ppm tetramethylammonium hydroxide (hereinafter, abbreviated as TMAH) that shows biological toxicity. The developer-containing waste water also contains various types of hard-to-decompose surfactants, alcohols, and colored resists, in addition to the TMAH.

Specifically, the hard-to-decompose surfactants contained in developers are, for example, alkylammonium based or polyoxyethylene based surfactants.

As the method of waste water treatment for use in the factories, available are chemical treatment methods such as neutralization, reaction, and flocculation, biological treatment methods such as biological films, contact oxidation, activated sludge, and special microorganism treatment, and physical treatment methods such as precipitation, filtering, adsorption, floatation, and film treatment (hereinafter, these biological and physical treatment methods will be abbreviated generically as pretreatment process), which would be selected depending on water quality of the waste water. Actually, the aforementioned treatment methods are used singly or in combination of some of them, so that high concentration toxic waste water is treated and discharged (see Japanese Patent Laid-Open Publications HEI 1-9500 and SHO 64-43306). Further, in actual cases, the conventional apparatus for waste water treatment would be provided with an activated charcoal adsorption tower at the treatment terminal, as necessary, under stringent discharge regulations.

As described above, in the case of treatment within factory sites, it has been common practice that waste water is subjected to chemical treatment, biological treatment, and physical treatment for a long time followed by treatment at the activated charcoal adsorption tower, generally within factory sites. Then, high concentration toxic waste water containing surfactants is treated up to a water quality level lower than the legal regulation level and, as such, discharged.

Also, since the activated charcoal to be contained in the activated charcoal adsorption tower is expensive in its unit price itself, short in service life before regeneration, and high in its running cost, the use of so-called activated charcoal with microorganisms is nowadays increasingly spreading in which microorganisms are propagated in activated charcoal and organic substances adsorbed by the activated charcoal are treated by the microorganisms.

The tower, whether it is a tower containing the aforementioned activated charcoal or another containing the aforementioned activated charcoal with microorganisms, has conventionally had a structure that activated charcoal is filled only in various types of different towers in different ways.

Recently, planned sites for new semiconductor and liquid crystal factories tend to be vast places or areas of inexpensive land prices. Such areas are in many cases those remote from cities and good in natural environments (areas good in water quality of rivers and free from air pollution), generally.

In particular, in areas with good natural environments, the river into which factory waste water is discharged may be so good in water quality as can be classified as a clear stream. Such rivers with good water quality mean water areas of lean saprobic or β-median saprobic water areas in terms of the soil water biology system. The β-median saprobic water areas refer to slightly dirtied water areas where ayu fish or fireflies are living.

In such an area with a good natural environment, for an apparatus for waste water treatment or an apparatus for prevention of air pollution to be planned with emphasis laid on the environment of the area, there is a possibility that the environment of the area may be adversely affected by the plan even if the legal regulation levels and municipal regulation levels are merely observed. Accordingly, it is necessary to reduce the load given to environments by effluent water and discharged exhaust gases as much as possible. More specifically, it is insufficient for the effluent waste water to be only legally acceptable in measurement of water quality. The effluent water will not become treated water having a good impression for the local residents unless it is treated to such a level as will neither be foamed by a slight amount of hard-to-decompose surfactant nor generate any slight malodorous gas. Further, from the background for the water quality of effluent water discharged by semiconductor factories and liquid crystal factories, there are increasing numbers of cases where local residents will not easily accept new plans of waste water treatment. In the current days, in which such a regional environment has been reached that local residents demand strict level of treated water, it is necessary to take into account not only ecosystems surrounding the whole area but also appearances of treated water. Consequently, the present situation is that there is a desire for development of an apparatus and method for waste water treatment which will not change the local environment, nor give any influence on the local environment, and which is high in level and properly economical, and moreover which is well designed in terms of cubic structure so as to involve a less installation area.

In contrast to this, the above-mentioned conventional counterpart is purposed to achieve waste water treatment so that only legal restrictions are observed in respects of TMAH, surfactants, alcohols, and resists. As a result, even after the waste water treatment is executed, slight amounts of hard-to-decompose surfactants and slight amounts of resists may remain in the treated water. The hard-to-decompose surfactants may be a cause for a slight amount of foam in the treated water. Also, the light amounts of resist will color the treated water yellowish. The conventional counterpart has not been cared for economically preventing these slight amounts of foaming and coloring in the treated water.

In the semiconductor factories and liquid crystal factories, even foaming due to surfactants derived from treated water and coloring of resist components of treated water would matter for the neighbor residents from the viewpoint of maintaining the local environment. In particular, when the water of the effluent river is utilized as agricultural water, it would matter for the neighboring residents.

As the measures for this problem, i.e., measures for slight amounts of surfactants and coloring components in the treated water at the final stage of waste water treatment, the aforementioned activated charcoal adsorption treatment is commonly adopted. However, the activated charcoal adsorption treatment has a drawback that the activated charcoal will decrease in amount of adsorption in a certain period so that its service life is short, arising a need of carrying the activated charcoal to the outside and regenerating it.

Recently, there have been developed various types of treatment apparatus using activated charcoal with microorganisms (Japanese Patent Laid-Open Publications HEI 2-229595 and HEI 4-260497). Those are however designed for no more than water purification of relatively good water quality and, in particular, not designed for treatment of waste water containing hard-to-decompose surfactants that would take considerable time. Besides, the apparatus are those which use granular activated charcoal with high initial cost. Also, those apparatus use various types of methods or systems to fill activated charcoal in the particular tower for use of activated charcoal charge, thereby achieving water purification.

Further, the activated charcoal utilized in the above apparatus for high-level waste water treatment are in most cases granular activated charcoal involving relatively high initial cost, whether coconut shell based or coal based. This causes the apparatus for waste water treatment to increase in its initial cost, with the result of worse economy.

Also, in most cases, the time of contact with activated charcoal in the activated charcoal tower is within 2 hours. Therefore, the time for which microorganisms act especially on hard-to-decompose chemical substances is insufficient for reliable treatment to be expected. Although it is possible to design for a sufficient time of contact with activated charcoal if necessary, the conventional method of activated charcoal treatment would result, impracticably, in high initial costs of treatment facilities because of a large quantity of activated charcoal with high unit prices in order to ensure contact reaction time of 6 hours or more for influent water. In either case, the activated charcoal would result in high initial costs for facilities, impracticably.

Meanwhile, malodorous gas is generated from the aforementioned factories, although in very small amounts. More specifically, they include malodorous gases derived from chemicals used in production processes and special gases, malodorous gases generated from source tanks and the like for household waste water treatment and production system waste water treatment, and the like. Even these malodorous gases of small amounts may matter in districts with particularly good environments. However, although such malodorous gases of small amounts would matter, planning general apparatus for malodorous gas treatment would cause increase in construction cost and maintenance cost, problematically. In other words, there is a desire for means for malodorous gas treatment that requires extremely low initial cost and running cost. Several treatment systems have conventionally been available as the means for treatment of malodorous gases, including the scrubber system with washing by chemicals or water, the adsorption system with the use of activated charcoal and the combustion system. However, as a matter of course, they have encountered great problems of initial cost, running cost, maintenance, large installation spaces, and the like.

In particular, as in the aforementioned semiconductor factories and liquid crystal factories, apparatus for malodorous gas treatment should be planned when, even if legally acceptable, malodorous gases may be generated more or less so as to give rise to neighboring residents' claims. However, actually, it is excessive and uneconomical to provide a full-scale apparatus for malodorous gas treatment in order to solve such a small amount of malodor.

When granular activated charcoal is adopted as in the conventional system, there would be a problem that the granular activated charcoal may flow out of the apparatus if the back washing flow rate fails to be properly controlled in the process of back washing, because the activated charcoal is granular.

In either case, the conventional apparatus and method would tend to result in insufficient treatment in the case where high concentration toxic waste water containing large amounts of hard-to-decompose surfactants and resist components, which both would be hard to biodecompose and demanding considerable time for treatment, is to be treated in conformity to local environments. Thus, there is a possibility that, needless to say, the treated water may foam, but also that the water quality of effluent districts may undergo change that would affect the ecosystem of the effluent districts.

The reasons of the above include: (1) since the surfactants and resist components used in the aforementioned factories are hard-to-decompose chemical substances that have difficulty in biodecomposition, the conventional various types of methods using activated charcoal would be such that the activated charcoal, even if first act for adsorption to some extent, would soon come to an end of life such as not to act for adsorption; and (2) even with the use of activated charcoal with microorganisms, since the surfactants are hard-to-decompose, a contact reaction time of only 2 hours or so is insufficient, such that the hard-to-decompose chemical substances could not be biodecomposed with reliability and efficiency.

As shown above, the conventional method of waste water treatment has a problem that, with respect to the high concentration waste water of the aforementioned factories, surfactants, which are small amounts of hard-to-decompose chemical substances that would take considerable treatment time, and small amounts of organic substances and coloring components could not be treated economically and reliably even if activated charcoal is used.

The following description is based on experimental results. Even if the high concentration toxic waste water treated without dilution by the conventional method of waste water treatment is considered to be sufficiently safe on the basis of its analytical values from the standard of the current analytical technique, there will arise a phenomenon that foaming is caused by the small amounts of surfactants provided that effluence gap exists in the flow of effluence. This foaming phenomenon, although legally acceptable, may be misunderstood to be imperfect as treatment from the standpoint of neighboring residents. Further, when the high concentration waste water is treated by increasing the concentration of microorganisms without dilution, both the microorganism concentration and the waste water concentration are high in the aeration tank so that slight amounts of organic malodorous gases will be generated. Meanwhile, the treated water having such quality that larger quantities of foams due to hard-to-decompose surfactants are generated could not be said to be safe to small fish living in the rivers of the aforementioned good natural environment districts and to the biological ecosystem of marsh snails, which are a kind of snail that is a feed for fireflies. Those local creatures such as small fish and marsh snails generally have low resistance to environmental changes so that they could not live in the treated water, especially when the treated water is derived from treatment of the high concentration waste water only by the conventional method without dilution.

The concrete reason that the above local creatures of the above district could not live in the above treated water can be considered that since the high concentration waste water is treated without dilution, a large amount of decomposed organic substances remain, and that the conditions of small amounts of hard-to-decompose surfactants and organic substances are insufficient for the creatures to live in the treated water.

As for the appearance of the treated water, since the high concentration waste water of the above factories is colored in the waste water itself, the conventional treatment method without dilution would involve the colored treated water. Therefore, if the treated water is discharged into rivers that can be said to be clear streams, there may arise a problem.

Meanwhile, a method of treatment not without dilution but by diluting the high concentration waste water to ten times or so is also available. However, in this case, the waste water treatment facilities involved would be very large scale, uneconomically.

To summarize up the above description, the conventional method for waste water treatment with an activated charcoal tower is disadvantageous in the following points:

(1) Even if the treated water discharged into public water regions with good environments satisfies the above-mentioned legal restriction values and regulation values, a gap between effluent piping and effluent public water region, if any, would cause the foaming phenomenon due to small amounts of hard-to-decompose surfactants, resulting in bad appearance. Also, the colored substances, if not completely treated, would also cause bad appearance. A matter of course as it is, the conventional activated charcoal tower could not treat malodorous gases. In addition, in principle, the activated charcoal tower could not treat nitride, phosphorus, and salts.

(2) The waste water treated by the conventional method has such water quality as may affect aquatic animals vulnerable to environmental pollution, such as small fish and marsh snails. Therefore, the conventional method may adversely affect the earth environment.

In other words, in effluent regions which are free from environmental disruption and have a small amount of river water, like the recent planned sites for semiconductor factories and liquid crystal factories, the treated water, even if it meets regulation values such as described above so as to be legally acceptable, may often affect the biological ecosystem. As a result, if such treated water is discharged, there arises a great danger of destroying the biological ecosystem of creatures vulnerable to environmental disruption, which is a problem.

For example, from experimental results, it is shown that even if the high concentration toxic waste water is treated without dilution and passed through the activated charcoal tower so that the waste water satisfies the legal restrictive values, aquatic animals vulnerable to environmental disruption, such as small fish and marsh snails, could not live in the treated water.

Furthermore, there has so far been unavailable any apparatus for waste water treatment, which can treat not only waste water containing hard-to-decompose surfactants and resist components but also malodorous gases at the same time and which can reduce the initial cost and the running cost.

SUMMARY OF THE INVENTION

The present invention has been developed with a view to substantially solving the above described disadvantages of the conventional apparatus and method for waste water treatment. That is, the present invention has for its essential object to provide an apparatus and a method for waste water treatment which is capable of not only high level treatment of waste water but simultaneously and comprehensively treating small amounts of hard-to-decompose surfactants and colored substances and malodorous gases in the waste water as well and moreover which is economical.

In order to achieve the aforementioned object, the apparatus for waste water treatment according to the present invention is characterized by comprising a contact circulation part having a cultivation bed on which an aquatic plant has been grown, and charcoal in which microorganisms have been grown, the contact circulation part being so arranged that treatment-object water pretreated in a pretreatment process is introduced into the contact circulation part so that the contact circulation part will be submerged in the treatment-object water; and an air-diffusing part disposed above the contact circulation part and having charcoal in which microorganisms have been grown, the air-diffusing part being so arranged that the treatment-object water derived from the contact circulation part is introduced by an air lift pump and sprinkled on the air-diffusing part, and that the treatment-object water that has passed through the contained charcoal is returned to the contact circulation part so that the air-diffusing part will not be submerged in the treatment-object water.

In the apparatus for waste water treatment with the above-described arrangement, pretreated treatment-object water, which is to be treated, is introduced into the contact circulation part. The treatment-object water contains a small amount of hard-to-decompose surfactant and a small amount of resist component. Then, the treatment-object water is led from the contact circulation part that is normally in contact with the treatment-object water to the sprinkling circulation part that is in contact with air. Then, the treatment-object water is returned from the sprinkling circulation part to the contact circulation part again. In other words, the apparatus for waste water treatment performs waste water treatment by circulating the treatment-object water through the contact circulation part and the sprinkling circulation part, which are different in function from each other.

The charcoal provided in the contact circulation part and the sprinkling circulation part first adsorbs the treatment-object substance, and then microorganisms immobilized in the charcoal provided in the sprinkling circulation part and the contact circulation part propagate taking organic substances in the treatment-object water as nutrition sources. By this function, the organic substances contained in the treatment-object water are biologically treated.

The charcoal is a porous body having a large number of thin pores, a set of various types of pores whose diameter ranges from a few microns to a few hundreds of microns, such that various types of microorganisms will easily propagate in the charcoal. Also, because of the presence of various types of pores, microorganisms matching their sizes will easily live. Further, since biological film layers are formed inside the charcoal as a result of the propagation of the various types of microorganisms, such chemical substances as hard-to-decompose surfactants and resist components, which are generally difficult to biodecompose, are adsorbed to the charcoal and biodecomposed. Small amounts of minerals contained in the charcoal lend themselves to growth or culture of aquatic plants, and the aquatic plants in turn lend their chemical substance absorbing ability to the biological treatment of waste water.

Thereafter, the treatment-object water, i.e., the waste water, circulates to make repeated contact with the activated charcoal on which microorganism films are formed. As a result, such organic substances as hard-to-decompose surfactants and resist components are treated in contact decomposition at high level.

Microorganisms that will well propagate in the charcoal are exemplified by bacteria, fungi, actinomyces, algae, photosynthetic bacteria, and the like. The surface area of the charcoal per gram is reported to be not less than 200 m$^2$ (according to Japanese National Charcoal Association). Accordingly, the charcoal has substantially large areas of biological film layers in its inside and therefore has substantially high ability of treating organic substances.

In the charcoal of the sprinkling circulation part in contact with air, fungi other than those which propagate in the charcoal submerged in water (i.e., microorganisms such as molds, algae, and bacteria) will propagate, serving for treatment of organic substances in the waste water. Thus, since the microorganisms propagating in the charcoal of the sprinkling circulation part and the microorganisms propagating in the charcoal of the contact circulation part are different in type from each other, such treatment-object substances as hard-to-decompose surfactants and resist components are biologically treated at high level.

The charcoal is produced by carbonizing wood. The charcoal has an organic structure as if thin tubes that pass both longitudinally and laterally were bundled, like the wood. The charcoal is inferior in adsorbing ability to the activated charcoal. In other words, the activated charcoal is composed mostly of charcoal itself, thus having a superior adsorbability. However, the activated charcoal is disadvantageous in high cost. The charcoal is much lower in cost than the activated charcoal. The charcoal is economical by virtue of its unit price about 1/5 times lower than that of the activated charcoal. As a result, when the design is to take relatively much time of contact with the treatment-object water, adopting charcoal rather than activated charcoal will be actually effective from the economic point of view.

Also, since the treatment-object water derived from the contact circulation part is introduced to the sprinkling circulation part by an air lift pump, a sufficient amount of oxygen is fed to the treatment-object water so that aerobic microorganisms are activated for more action, which facilitates biological treatment of the treatment-object water.

According to an embodiment of the present invention, the contact circulation part has Bincho charcoal in which microorganisms have been grown, while the sprinkling circulation part has black coal in which microorganisms have been grown. The Bincho charcoal (a kind of white charcoal), because of its specific gravity not less than 1, will be immersed in the contact circulation part that is submerged in water and moreover will hardly be fractured even by intense aeration. Further, the black coal of the sprinkling circulation part, because of its specific gravity smaller than 1, is superior in adsorbability to other charcoal, thus suited for treatment in the case of densely colored treatment-object water.

Also, according to an embodiment of the present invention, an illumination means for illuminating a cultivation bed on which aquatic plants are grown is provided on the cultivation bed. The growth of aquatic plants is accelerated by the light from the illumination means. When the light from the illumination means is applied to the charcoal of the contact circulation part and the sprinkling circulation part, algae and photosynthetic bacteria will propagate on the surface of the charcoal so that the biological treatment of the treatment-object water is accelerated.

Leaves and roots of the aquatic plant act to absorb primarily nitrate salts and small amounts of chemical substances remaining in the treatment-object water. The leaves and roots of the aquatic plant have a function of self-cleansing action of nature. The aquatic plant acts to absorb nitrate salts and small amounts of dissolved chemical substances by the same action of hydroponic culture as with the general plants.

Further, small amounts of minerals contained in the charcoal are useful for the growth of aquatic plants. That is, the charcoal has both functions of serving as a microorganism-immobilizing carrier and feeding minerals to the algae and aquatic plants (conventionally, Japanese farmers use charcoal in culturing plants such as trees and vegetables).

Also, according to an embodiment of the present invention, the air-supply agitating means feeds air to the contact circulation part from below and agitates the treatment-object water in the contact circulation part. The operating ability of the air-supply agitating means is controlled to higher or lower level by an agitation control means. Accordingly, anaerobic and aerobic conditions are forced to appear alternately within the contact circulation part. As a result, anaerobic denitrifying bacteria immobilized at the depth of the charcoal and nitrating bacteria immobilized on the surface of the charcoal are both put into effective operation, so that the treatment-object water can be nitrated and denitrified.

Also, according to an embodiment of the present invention, the contact circulation part comprises an agitation-use air-diffusing tube for discharging air to agitate the treatment-object water, and an air-diffusing tube for discharging malodorous gas needing to be treated into the contained charcoal.

Malodorous gas is discharged from the air-diffusing tube and thereby put into contact with biological films composed of microorganisms that have propagated in the charcoal, where the malodorous gas is biologically treated. In this process, since components in the malodorous gas also serve as nutrition sources for the microorganisms, microbial treatment of hard-to-decompose surfactants by the microorganisms is accelerated.

Further, the malodorous gas discharged from the air-diffusing tubes can pass not only the contact circulation part but also the sprinkling circulation part above the contact circulation part. With this arrangement, the malodorous gas can be microbiologically treated in two steps while the malodorous gas collides with the charcoal in which microorganisms propagate, and thus treated with reliability.

Further, the present invention provides a method for waste water treatment, comprising steps of:

introducing treatment-object water pretreated in a pretreatment process into a contact circulation part having a cultivation bed on which an aquatic plant has been grown and charcoal in which microorganisms have been grown, so that the contact circulation part is submerged in the treatment-object water;

introducing malodorous gas to the contact circulation part;

lifting the treatment-object water from the contact circulation part by an air lift pump and sprinkling the treatment-object water onto a sprinkling circulation part having the charcoal in which microorganisms have been grown; and returning the treatment-object water that has passed through the sprinkling circulation part to the contact circulation part.

This method for waste water treatment has an advantage that not only waste water but also malodorous gas can be treated at the same time. Therefore, with application of the method for waste water treatment, investment efficiency for the waste water treatment facilities can be considerably increased so that waste water treatment cost can be reduced.

Available as the aquatic plant are seedlings which have been accelerated for growth of leaves and roots by improvement of species and which have been mass-produced by biotechnologies such as tissue culture. In this case, aquatic plants and other like plants become easier to industrially utilize, and seedlings matching purposes become easier to get in bulk.

Also, as the aquatic plant, those which are picked up from the river into which the waste water is to be discharged may be utilized. In this case, oligotrophic microorganisms and algae and others which are sticking to the picked-up aquatic plant are propagated in greater quantities by the contained charcoal. Therefore, self-cleansing action of nature is more activated artificially, so that the treatment-object water is adapted to water quality of the effluent river.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, the present invention is described in detail based on an embodiment of the invention illustrated in the accompanying drawings.

Figure 1:
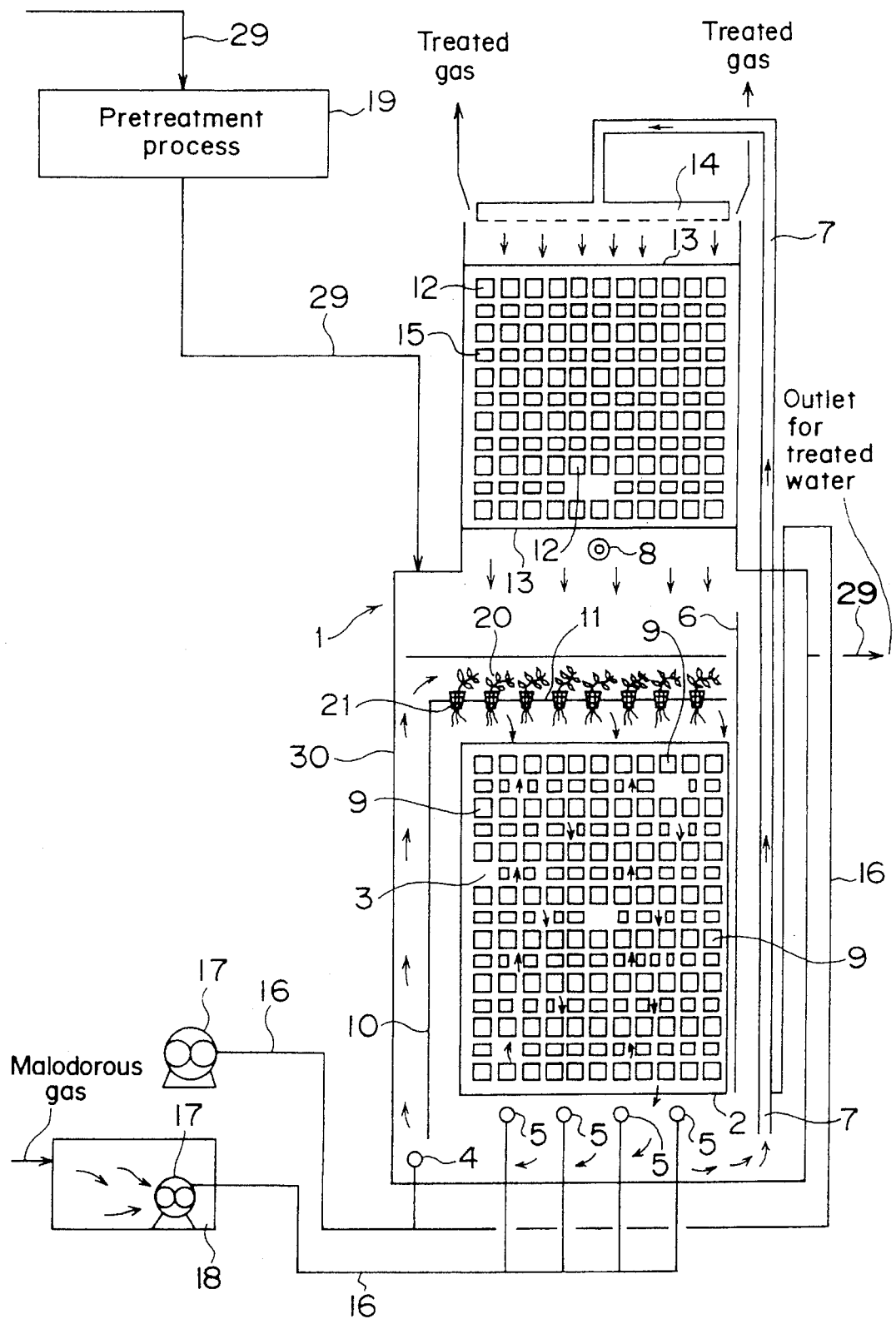
FIG. 1 is a view schematically showing an embodiment of the apparatus for waste water treatment provided with charcoal biologically activated according to the present invention.

FIG. 1 is a schematic view of the apparatus for waste water treatment having charcoal biologically activated according to an embodiment of the present invention.

Figure 4:
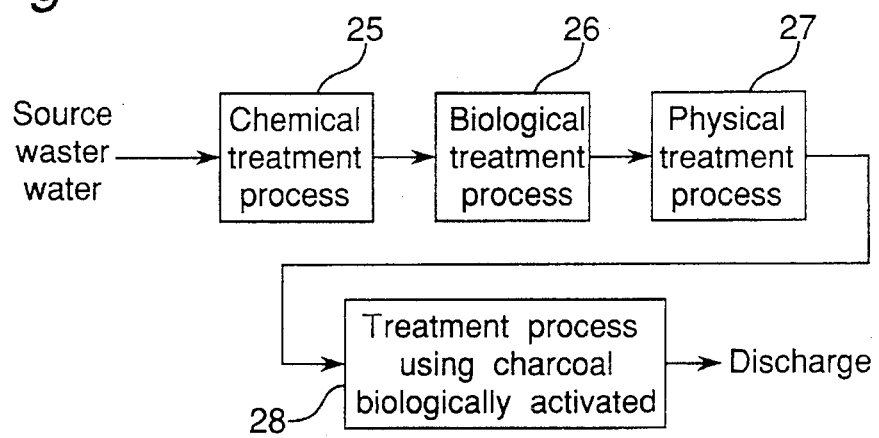
FIG. 4 is a system view for explaining the pretreatment steps of the embodiment.

In FIG. 1, reference numeral 1 denotes an apparatus for waste water treatment having charcoal biologically activated. In the apparatus 1 for waste water treatment, treatment-object water is introduced from a pretreatment process 19 to which high concentration toxic waste water is introduced. In the pretreatment process 19, a chemical treatment process 25, a biological treatment process 26, and a physical treatment process 27 as shown in FIG. 4 are carried out in succession. Also in the apparatus 1 for waste water treatment, a treatment process 28 by the charcoal biologically activated is carried out.

The apparatus 1 for waste water treatment comprises a sprinkling circulation part 13 located above and a contact circulation part 3 located below. The sprinkling circulation part 13 and the contact circulation part 3 are disposed at a specified spacing in a tank 30.

Connected to the apparatus 1 for waste water treatment is a malodorous gas introduction chamber 18 to which malodorous gas generated at places within the factory is introduced. This malodorous gas introduction chamber 18 is equipped with a blower 17 so that introduced malodorous gas is led into the apparatus 1 for waste water treatment via delivery piping 16. Air-diffusing tubes 5 connected to the delivery piping 16 are disposed under the contact circulation part 3. The air-diffusing tubes 5 discharge malodorous gas to a filler material.

Also, an activated charcoal tower or a tower containing activated charcoal with microorganisms is provided at the terminal of the pretreatment process 19.

Figure 2:
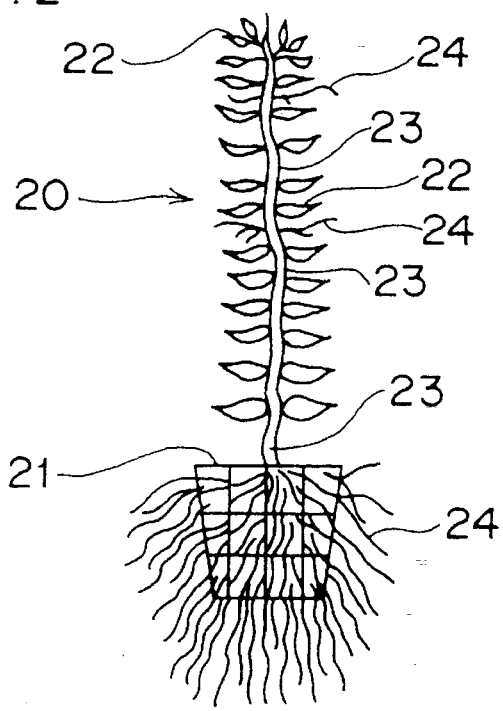
FIG. 2 is a detailed view of state of an aquatic plant accommodated in the aquatic plant accommodation basket used in the above embodiment.

The contact circulation part 3 comprises a circulation-in-tank use air-diffusing tube 4 for agitating tank interior, and Bincho charcoal 9, which is a kind of charcoal and serves as the filler material, the filler-material use air-diffusing tubes 5 for stirring the Bincho charcoal 9, an air lift plate 10 for rectifying the up water streams in the tank, and a cultivation bed 11 attached to the air lift plate 10 and disposed at an upper portion thereof. The cultivation bed 11 has an aquatic plant 20 under growth. The aquatic plant 20 is accommodated in aquatic plant baskets 21 installed on the cultivation bed 11 at regular intervals. The aquatic plant baskets 21 are preferably mesh containers of such a structure that the roots of the aquatic plant 20 can freely stretch. As the material of the aquatic plant baskets 21, polyethylene and polyvinyl chloride that will not affect water quality are selected. The aquatic plant 20 is, for example, *Hydrilla verticillata,* wizard waterweed, water cultrop, *Vallisneria asiatica,* tortuose waterweed, or the like, which are aquatic plants of submersed type available in the effluent district. The aquatic plant 20 may also be floating type water hyacinth, watercress, Japanese parsley, which can also be foods, packbun, which is well known as an aquatic vegetable, or the like. However, since the purpose is waste water treatment, the aquatic plants 20 are most suitably an aquatic plant which grows throughout the year and which is of the submersed type and normally submerged, which is exemplified by the aforementioned *Hydrilla verticillata,* water caltrop, and the like. These will seldom die if the water temperature is kept at specified values throughout the year. Also, the aquatic plant 20 was prepared in bulk of a species that has a large treatment capacity by biotechnologies such as tissue culture and cell fusion. As shown in FIG. 2, the aquatic plant 20 has leaves 22 and roots 24. Particularly, the above-mentioned waterweed, if sufficiently grown, will have a white root 24 grown from its stem 23.

The Bincho charcoal 9 is accommodated in a container 2. The container 2 is unspecific in its material and whatever can accommodate the Bincho charcoal 9 therein will do. The container 2 may be a mesh container made of a resin such as polyethylene, or a stainless container, for example.

The Bincho charcoal 9 is a Japanese traditional charcoal, meaning a white coal of an ilex, which is a broadleaf tree. The white coal is a charcoal carbonized at around 1000° C. and classified as a high temperature carbonized charcoal. Meanwhile, as the Bincho charcoal 9 used in this embodiment, it is preferable, but not indispensable, to select 4 to 6 cm diameter and 5 cm or more long Bincho charcoal, so that successful contact stirring in the contact circulation part 3 can be obtained. Since the Bincho charcoal 9 having a certain level of size will not flow away from the tank at the time of back washing, it is convenient to select rather large Bincho charcoal 9 for is of use. Also, since the Bincho charcoal 9 has a specific gravity of not less than 1, it will submerge in the water, and will almost never be crushed even by strong aeration. Thus, the Bincho charcoal 9 is suited for the filler material for high level waste water treatment, as compared with other types of charcoal.

Figure 3A:
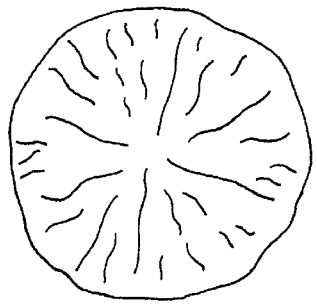
FIG. 3A is a front view of a charcoal that typifies the Bincho charcoal and black coal used in the above embodiment and FIG. 3B is a side view of the charcoal.
Figure 3B:
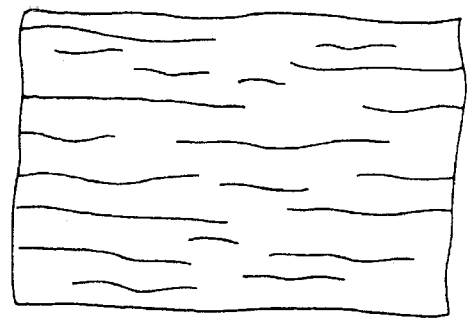

Denoted by numeral 7 is an air lift piping. The air lift piping 7 and air piping 16 make up an air lift pump. This air lift pump functions to flow the treatment-object water present in the contact circulation part 3 into a water-sprinkling tube 14 installed upward of a sprinkling circulation part 15. The treatment-object water is sprinkled above the sprinkling circulation part 15 as uniformly as possible by the water-sprinkling tube 14. Black coal 12 is filled between upper and lower mesh sheets 13, 13 provided in the sprinkling circulation part 15. The charcoal to be filled in the sprinkling circulation part 15 is not limited to the black coal 12 but may be other types of charcoal. FIG. 3A is a view of a typical charcoal as seen from the front and FIG. 3B is a view of the same as seen from the side. The charcoal may be, for example, the aforementioned Bincho charcoal, and otherwise retorted charcoal, open-hearth charcoal. However, if the treatment-object water is colored heavily, the black coal 12, which is superior in adsorbability, should be selected. This is because the black coal 12 exhibits the highest adsorbability at an iodine adsorption test, as compared to other charcoal.

In all the black coal 12 of the sprinkling circulation part 15, various types of microorganisms propagate, serving for treatment of the treatment-object water. The microorganisms generally refer to a wide variety of tiny creatures, and are said to be in a range of 1000 to 2000 species in the field of waste water treatment.

Also, since an illumination 8 is installed under the lower mesh sheet 13, light from the illumination 8 is applied to the bottom part of the black coal 12 below, where various types of algae will propagate and serve for treatment of the treatment-object water.

As the illumination 8, it is desirable to select, for example, a high pressure sodium lamp or the like which is utilized for growth of plants in plant factories. The high pressure sodium lamp, which has a wide spectral range of yellow band, is a lamp having excellent efficiency. The lamp is used as those for plant factories by virtue of its long service life as much as 12000 hours. The lamp takes a relatively low electrical cost among all the types of lamps, costing approximately one half the fluorescent lamp.

It is a matter of course that using incandescent lamps, fluorescent lamps, high pressure mercury lamps, metal halide lamps, xenon lamps, or the like instead of the high pressure sodium lamp also offers a certain level of effect. However, the high pressure sodium lamp is the most economical, efficient lamp.

When a large quantity of waste water is involved, the apparatus 1 for waste water treatment with charcoal biologically activated may be formed of not netted sheets but concretes, which are relatively inexpensive. In this case, the total initial cost can be further reduced, as compared with the conventional activated charcoal tower and tower containing activated charcoal with microorganisms.

High concentration toxic waste water discharged from semiconductor factories and liquid crystal factories, for example, developer-containing waste water containing various types of surfactants and resist components is introduced to the pretreatment process 19 without dilution or with dilution. In this pretreatment process 19, the waste water is treated by a chemical, biological, or physical method or by combination of some of them, and thereafter introduced to the apparatus 1 for waste water treatment having charcoal biologically activated.

The treated water discharged from the pretreatment process 19 has not been treated so rigorously that the hard-to-decompose surfactants or resist components may be discharged into districts with good environments. Therefore, if the treated water is discharged as it is, the water at the place of discharge may foam or be colored.

The treated water over the pretreatment process 19 is first introduced to the contact circulation part 3 within the apparatus 1 for waste water treatment with charcoal biologically activated.

The Bincho charcoal 9 adsorbs hard-to-decompose surfactants and resist components contained in the treated water.

On the surface of the Bincho charcoal 9 of the aquatic plant baskets 21 and the cultivation bed 11 and upper portions of the contact circulation part 3, algae such as diatom and blue-green algae will be generated by illumination of the illumination 8 installed above the mesh cultivation bed 11. These algae such as diatom and blue-green algae act to separate organic substances such as surfactants contained in the treated water. Also, the algae such as diatom and blue-green algae act to separate not only organic substances but also nitride and phosphorus such as of ammoniacal nitrogen, nitrite nitrogen, and nitrate nitrogen.

Air is discharged from the air piping 16 and rises within the air lift piping 7, whereby the treated water in the contact circulation part 3 is introduced to the air lift piping 7 and released out from the water-sprinkling tube 14. The treated water discharged from the water-sprinkling tube 14 reaches the black coal 12 in the mesh sheets 13, where the surfactants and resist components are adsorbed by the black coal 12. Further, the black coal 12 can effectively adsorb, in particular, iodine, as compared with other charcoal.

Meanwhile, by operation of the blower 17, malodorous gas is sucked into the malodorous gas introduction chamber 18. Then, the malodorous gas is discharged from the air-diffusing tubes 5. Air discharged from the air-diffusing tubes 5 for filler materials is an air containing malodorous gas derived from the semiconductor factories and liquid crystal factories. The malodorous gas is actually any one of malodorous gases generated from source water tanks for household waste water in the above-mentioned factories, from the source tank for waste water resulting from processes, and from productive processes. Out of those malodorous gases, especially a gas containing gaseous organic components to be selected is preferable. The gaseous organic components to be selected refer to components that make nutrition sources for microorganisms propagating in the charcoal. However, it is not essential that the gas contains such gaseous organic components. Items for which the malodorous gas derived from the source water tank for household waste water is analyzed are, for example, ammonium, hydrogen sulfide, methyl mercaptan, methyl sulfide, trimethylamine, and the like, where these items are detected from the malodorous gas in small amounts.

The surface of the Bincho charcoal 9 charged at the upper stage of the contact circulation part 3 is illuminated with light from the illumination 8, so that algae and photosynthetic bacteria will be generated. The algae and photosynthetic bacteria act to absorb nitrogen and phosphorus and, needless to say, dissolved salts and to decompose organic substances in the treatment-object water. The photosynthetic bacteria include red bacteria and green bacteria.

In this way, the malodorous gas is blasted from the air-diffusing tubes 5 to the Bincho charcoal 9 of the contact circulation part 3. As a result, the malodorous gas is decomposed by biological films formed of microorganisms propagated in the Bincho charcoal 9. Then, the malodorous gas, after being lifted through the contact circulation part 3 and treated, is introduced to the sprinkling circulation part 15. The malodorous gas contacts and collides also with the biological films formed on the surface of the black coal 12 of the sprinkling circulation part 15, where the malodorous gas is treated also by these biological films on the surface of the black coal 12. Accordingly, the malodorous gas is treated in two steps with reliability.

For effective treatment, the apparatus should be so designed that the malodorous gas is discharged at a rate of 40 m$^3$ or less per day for every 1 m$^3$ Bincho charcoal 9 of the contact circulation part 3, although it varies depending on components and concentration of the malodorous gas, precisely. However, this condition is not essential.

Meanwhile, air should be discharged from the air-diffusing tube 4 for use of agitating in the tank necessarily at a rate of 60 m$^3$ or more per day for every 1 m$^3$ capacity of tank.

Up streams are generated by the air discharged from the air-diffusing tube 4 for circulation in the tank and by the air lift plate 10. Further, the inside of the tank is more successfully mixed and agitated by malodorous air discharged from the air-diffusing tubes 5 for filler materials. Surfactants foam at the water surface. However, the water surface of the contact circulation part 3 in the present embodiment is in its most active portion agitated by two types of air, thus having no space for foams to stay. As a result, foams themselves are treated with high efficiency.

Since the illumination 8 is installed below the sprinkling circulation part 15, the black coal 12, to which light is applied, has biological films formed by microorganisms such as photosynthetic bacteria and algae, where organic substances are decomposed. Although the illumination 8 has been provided at only one place in the present embodiment, providing illumination at several places in the contact circulation part 3 and the sprinkling circulation part 15 allows more photosynthetic bacteria and algae to propagate. This is useful particularly for enhancement in the rate of removing nitrogen and phosphorus.

The algae are a type of microorganisms closer to plants and therefore of course effective to nitrogen, phosphorus, and dissolved salts. The algae are exemplified by blue-green algae, green algae, and diatoms. In either case, the illumination 8 is a device useful for growth of aquatic plants as well as for propagation of algae and photosynthetic bacteria.

Accordingly, the provision of the illumination 8 allows the principle of treatment of the "oxidation pond", which takes advantage of natural solar energy, to be applied skillfully, so that the function of treating nitrogen and phosphorus, in particular, can be enhanced. A vast area has conventionally been needed to form the "oxidation pond."

Among other charcoal, the Bincho charcoal 9 has a specific gravity more than 1 and therefore, if thrown into water, will sink in water, so that the Bincho charcoal 9 body itself will not be fractured even by aeration with intense air streams, to an advantage. Common coal has a disadvantage that part of the coal body will be crushed by intense aeration and, as such, contained in the treated water, resulting in an increase in the value of SS (Suspended Solid), which is one item for effluent water quality. The Bincho charcoal 9 is large in volumetric density, hard natured, and hard to crush, so that it can be used for a long term more than 5 years without problems.

The amount of load permitted to flow into the contact circulation part 3 differs depending on type and concentration of hard-to-decompose surfactants as well as type and concentration of the resist components of the influent water. However, 6 hours or more contact reaction time in the contact circulation part 3 allows effective treatment of small amounts of surfactants and resist components in the treatment-object water.

As described above, according to the present embodiment, against the waste water containing small amounts of surfactants, i.e., the treatment-object water, surfactants that are the cause of foaming are absorbed by two types of charcoal, the black coal 12 and the Bincho charcoal 9 (first step), and then the surfactants are circulatorily treated in biological fashion with microorganisms that propagate in the charcoal (second step).

Yet, in the present embodiment, there are provided the contact circulation part 3 which contains the Bincho charcoal 9 as it is submerged in water, and the sprinkling circulation part 15 which contains the black coal 12 as it is left in air, i.e., not submerged in water, wherein different types of microorganisms are propagated in the Bincho charcoal 9 and the black coal 12. Accordingly, the present embodiment can make use of microorganisms in a wide variety including bacteria, fungi (molds, mushrooms, yeast, etc.), algae, and photosynthetic bacteria, thus capable of decomposing a wide range of types of surfactants.

The present embodiment uses low-unit-price charcoal that is a solid matter greater than activated charcoal. Therefore, it is economical and absolutely free from the possibility that filler materials may be flowed away at the time of back washing, which would take place in the conventional activated charcoal tower.

Further, in particular, hard-to-decompose surfactants and resist components are repeatedly treated by the adsorption of charcoal and the decomposition of a wide variety of microorganisms that have propagated in the charcoal, so that the rate of treatment per unit time can be enhanced. Moreover, the treatment-object water is circulated for treatment by an air lift through two-stage charcoal-containing treatment parts, the sprinkling circulation part 15 and the contact circulation part 3, so that an abundance of oxygen is fed into the tank 30, resulting in particularly good action of aerobic microorganisms. Furthermore, when a control unit is provided to control the air lift so that the discharge rate of air of the air lift is changed over between strong and weak, anaerobic and aerobic conditions are forced to appear alternately within the contact circulation part 3. Accordingly, both the denitrifying bacteria immobilized at depths of the Bincho charcoal 9 and the nitrating bacteria immobilized on the surface of the Bincho charcoal 9 are made to effectively function, so that the nitrating-denitrifying treatment of the treatment-object water is facilitated.

Also, in the present embodiment, microorganisms are propagated in the Bincho charcoal 9 and the black coal 12 for treatment of waste water, while malodorous gas is put into contact with the Bincho charcoal 9 and the black coal 12, in which the microorganisms have propagated, for biological decomposition treatment of organic substances contained in the malodorous gas. Accordingly, the present embodiment makes the best and skilful use of the function of the microbial treatment, whereby both waste water and malodorous gas can be treated at the same time by one unit of the apparatus 1 for waste water treatment.

Also, in the present embodiment, the aquatic plant cultivation bed 11 below the sprinkling circulation part 15, the cultivation bed 11 being illuminated with the illumination 8, wherein an aquatic plant 20 is cultured in the cultivation bed 11. Thus, salts and small amounts of components contained in the waste water and small amounts of components contained in the malodorous gas can be absorbed for treatment by the leaves 22 and roots 24 of the aquatic plant 20. Further, when the aquatic plant 20 is an aquatic plant collected from the river to which the waste water is discharged, oligotrophic bacteria and algae and others adhering to the collected aquatic plant are made to propagate to more extent by the contained Bincho charcoal 9. Accordingly, in this case, cleansing action of nature can be activated artificially, so that the treatment-object water can be adapted to the water quality of the effluent river.

Also, in the present embodiment, since the illumination 8 illuminates both the black coal 12 above and the Bincho charcoal 9 below, algae and photosynthetic bacteria can be actively propagated on the surfaces of the black coal 12 and the Bincho charcoal 9 by light energy. Yet, generation of oxygen by photosynthesis is also activated. Accordingly, nitrogen, phosphorus, salts, and others can be removed from the treatment-object water by the algae and photosynthetic bacteria.

Next described is experiment examples based on the above-described embodiment.

Pre-treated water is introduced into a treatment apparatus using charcoal biologically activated. The treatment apparatus has the same structure as the above-described embodiment and is 1.5 m long, 1.5 m wide, and 2.5 m high. The apparatus was operated at trial for about two months. Hydrilla verticillata was selected as the aquatic plant 20, and accommodated in the aquatic plant baskets 21. Temperature of the pre-treated water was controlled to 20° to 25° C. A high pressure sodium lamp, which is adopted in plant factories, was installed as the illumination 8 and put into 16 hour continuous illumination. Commercially available black coal for cleansing use, which had been carbonized at 600° to 700° C., was adopted as the black coal 12. Bincho charcoal which had been carbonized at around 1000° C. was adopted as the Bincho charcoal 9.

Whereas no change was observed in the upper and lower charcoal at the beginning of trial operation, biological film-like material was formed slightly on the surface of the charcoal. There appeared a unique, thin biological film based on charcoal, although it was not so thick as biological films that would appear on contact materials of the rotating disc system or immersion bed system for general waste water treatment.

After completion of the trial operation, water quality at the inlet of the treatment apparatus using charcoal biologically activated and water quality at the outlet of the treatment apparatus were measured over three days. The resulting data are shown below:

<Water quality at the inlet of the treatment apparatus using charcoal biologically activated>

| | |
|---|---|
| pH | 7.3 |
| COD | below 40 ppm |
| TOC | below 30 ppm |
| TMAH | below 2 ppm |
| ammoniacal nitrogen | below 36 ppm |
| nitrite nitrogen | below 32 ppm |
| nitrate nitrogen | below 26 ppm |
| cationic surfactant | below 2 ppm |
| anionic surfactant | below 2 ppm |

<Water quality at the outlet of the treatment apparatus using charcoal biologically activated>

| | |
|---|---|
| pH | 7.1 |
| COD | below 15 ppm |
| TOC | below 11 ppm |
| TMAH | below 0.5 ppm |
| ammoniacal nitrogen | below 1 ppm |
| nitrite nitrogen | below 3 ppm |
| nitrate nitrogen | below 47 ppm |
| cationic surfactant | below 0.5 ppm |
| anionic surfactant | below 0.2 ppm |

As understood from the above results, the concentration of cationic and anionic surfactants at the outlet of the waste water treatment apparatus 1 reduced to ¼ and ¹/₁₀ respectively, as compared with that at the inlet. The TMAH concentration also reduced to ¼.

Malodorous gas was also subjected to measurement. The results are as follows.

<Malodor concentration at the inlet of the treatment apparatus using charcoal biologically activated>
malodor concentration below 46

<Malodor concentration at the outlet of the treatment apparatus using charcoal biologically activated>
malodor concentration below 15

As understood from the above results, the malodor concentration at the outlet of the waste water treatment apparatus 1 reduced to ⅓, as compared with that at the inlet.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for waste water treatment, comprising:

a tank;

water introducing means connected to said tank for introducing waste water to be treated into said tank;

cultivation means disposed within said tank for supporting growing aquatic plants;

first charcoal container means disposed within said tank for containing charcoal which contains microorganisms, said water to be treated being introduced into said tank such that said first charcoal container means and said cultivation means supporting said growing aquatic plants are submerged in said water to be treated;

second charcoal container means disposed above said first charcoal container means and said cultivation means for containing charcoal which contains microorganisms; and sprinkling means for sprinkling water which has contacted said first charcoal container means and said cultivation means onto said second charcoal container means;

whereby water passes through said second charcoal container means and returns to said first charcoal container means and said cultivation means and said second charcoal container means is not submerged in said water.

2. The apparatus according to claim 1, wherein said water is transported to said sprinkling means by an air lift pump.

3. The apparatus according to claim 1, wherein said charcoal in said first charcoal container means is Bincho charcoal.

4. The apparatus according to claim 1, wherein said charcoal in said second charcoal container means is black coal.

5. The apparatus according to claim 1 and further including an illumination means for aiding the growth of algae and said aquatic plants.

6. The apparatus according to claim 1, and further including an air-supply agitation means for supplying air from below said first charcoal container means and an agitation control means for controlling the supply of air from said air-supply agitation means.

7. The apparatus according to claim 6, wherein said air-supply agitation means is an air-diffusing tube for discharging air into said water.

8. The apparatus according to claim 1, and further including an air-diffusing tube for discharging malodorous gas to be treated into the charcoal contained in said first charcoal container means.

9. An apparatus for waste water treatment, comprising:

a tank;

water introducing means connected to said tank for introducing waste water to be treated into said tank;

first charcoal container means disposed within said tank for containing charcoal which contains microorganisms, said water to be treated being introduced into said tank such that said first charcoal container means is submerged in said water to be treated;

second charcoal container means disposed above said first charcoal container means for containing charcoal which contains microorganisms;

sprinkling means for sprinkling water which has contacted said first charcoal container means onto said second charcoal container means; and an air-supply agitation means for supplying air from below said first charcoal container means;

whereby water passes through said second charcoal container means and returns to said first charcoal container means and said cultivation means and said second charcoal container means is not submerged in said water.

10. The apparatus according to claim 9 wherein said water is transported to said sprinkling means by an air lift pump.

11. The apparatus according to claim 9 wherein said charcoal in said first charcoal container means is Bincho charcoal.

12. The apparatus according to claim 9 wherein said charcoal in said second charcoal container means is black coal.

13. The apparatus according to claim 9 and further including an agitation control means for controlling the supply of air from said air-supply agitation means.

* * * * *